US00RE40317E

(19) United States
(12) Reissued Patent
Roskowski et al.

(10) Patent Number: US RE40,317 E
(45) Date of Reissued Patent: May 13, 2008

(54) SYSTEM FOR RECEIVING A CONTROL SIGNAL FROM A DEVICE FOR SELECTING ITS ASSOCIATED CLOCK SIGNAL FOR CONTROLLING THE TRANSFERRING OF INFORMATION VIA A BUFFER

(75) Inventors: Steven G. Roskowski, San Jose, CA (US); Dean M. Drako, Los Altos, CA (US); William T. Krein, San Jose, CA (US)

(73) Assignee: Apple Inc., Cupertino, CA (US)

(21) Appl. No.: 09/815,873

(22) Filed: Mar. 22, 2001

Related U.S. Patent Documents

Reissue of:
(64) Patent No.: 5,887,196
Issued: Mar. 23, 1999
Appl. No.: 08/185,275
Filed: Jan. 24, 1994

U.S. Applications:
(63) Continuation of application No. 07/815,696, filed on Dec. 30, 1991, now abandoned.

(51) Int. Cl.
*G06F 13/00* (2006.01)

(52) U.S. Cl. ..... 710/51; 710/3; 710/29; 710/33; 710/38; 710/55; 710/112; 710/167; 710/201; 375/372

(58) Field of Classification Search ..... 710/3, 710/29, 33, 38, 51, 55, 112, 167, 201; 375/372; 711/167, 201, 112
See application file for complete search history.

(56) References Cited

U.S. PATENT DOCUMENTS 3,109,162 A * 10/1963 Wolensky ..... 711/201
4,145,755 A * 3/1979 Suzuki et al. ..... 710/57
4,276,611 A * 6/1981 Jansen et al. ..... 710/100
4,402,040 A * 8/1983 Evett ..... 710/119
4,413,258 A * 11/1983 Quick, Jr. et al. ..... 340/825.5
4,423,480 A * 12/1983 Bauer et al. ..... 710/100
4,525,849 A * 6/1985 Wolf ..... 375/372
4,527,233 A * 7/1985 Ambrosius, III et al. ... 711/167
4,542,457 A * 9/1985 Mortensen et al. ..... 710/29
4,620,278 A * 10/1986 Ellsworth et al. ..... 710/119
4,621,342 A * 11/1986 Capizzi et al. ..... 710/111

(Continued)

FOREIGN PATENT DOCUMENTS

| | | |
|---|---|---|
| EP | 0038189 | * 10/1981 |
| EP | 0121030 | * 10/1984 |
| EP | 0127007 | * 12/1984 |
| EP | 0141742 | * 5/1985 |
| EP | 0240749 | 10/1987 |
| EP | 0121030 | 11/1987 |
| EP | 0127007 | 8/1989 |
| GB | 2256563 | * 12/1992 |
| JP | 246664 | * 10/1989 |

OTHER PUBLICATIONS

Alok N. Choudhary, et al. "A Modified Priority Based Probe Algorithm for Distributed Deadlock Detection and Resolution", pp. 10–18, IEEE vol. 15, No. 1, Jan. 1989.*

*Primary Examiner*—Tammara Peyton
(74) *Attorney, Agent, or Firm*—Fenwick & West LLP

(57) ABSTRACT

A computer system including a first component operated in response to the timing of a first clock, apparatus for storing information, apparatus for transferring information from the first component to the apparatus for storing information utilizing the clock of the first component, a second component operated in response to the timing of a second clock, apparatus for utilizing the clock of the second component to transfer information from the apparatus for storing information in a condition in which it is synchronized for use by the second component whereby the information may be immediately utilized by the second component without the need for storage by the second component.

30 Claims, 4 Drawing Sheets

U.S. PATENT DOCUMENTS 4,638,534 A * 1/1987 Sasaki et al. ..... 24/683
4,683,534 A 7/1987 Tietjen et al. ..... 710/307
4,766,536 A * 8/1988 Wilson, Jr. et al. ..... 710/121
4,766,538 A * 8/1988 Miyoshi ..... 710/127
4,837,682 A * 6/1989 Culler ..... 710/114
4,860,193 A * 8/1989 Bentley et al. ..... 710/55
4,860,244 A * 8/1989 Bruckert et al. ..... 711/219
4,864,496 A * 9/1989 Triolo et al. ..... 710/126
4,878,166 A * 10/1989 Johnson et al. ..... 710/127
4,920,486 A * 4/1990 Nielsen ..... 710/111
4,924,380 A * 5/1990 McKinney et al. ..... 710/111
4,937,733 A * 6/1990 Gillett, Jr. et al. ..... 710/108
4,939,644 A * 7/1990 Harrington et al. ..... 710/5
4,953,081 A * 8/1990 Feal et al. ..... 710/111
4,956,771 A * 9/1990 Neustaedter ..... 710/52
4,965,723 A * 10/1990 Kirk et al. ..... 710/127
5,010,325 A 4/1991 Ziuchkovski ..... 345/76
5,088,024 A * 2/1992 Vernon et al. ..... 710/111
5,097,437 A * 3/1992 Larson ..... 712/245
5,111,424 A * 5/1992 Donaldson et al. ..... 710/117
5,113,369 A * 5/1992 Kinoshita ..... 710/127
5,151,994 A * 9/1992 Wille et al. ..... 710/116
5,167,019 A * 11/1992 Fava et al. ..... 709/240
5,179,557 A * 1/1993 Kudo ..... 370/412
5,191,653 A * 3/1993 Banks et al. ..... 710/113
5,193,149 A * 3/1993 Awiszio et al. ..... 709/250
5,193,197 A * 3/1993 Thacker ..... 710/123
5,204,676 A * 4/1993 Herrmann ..... 341/61
5,210,829 A * 5/1993 Bitner ..... 710/57
5,218,676 A * 6/1993 Ben-Ayed et al. ..... 709/240
5,220,653 A * 6/1993 Miro ..... 709/107
5,222,223 A * 6/1993 Webb, Jr. et al. ..... 711/140
5,265,215 A * 11/1993 Fukuda et al. ..... 710/123
5,291,468 A * 3/1994 Carmon et al. ..... 711/112 X
5,452,436 A * 9/1995 Arai et al. ..... 709/400

* cited by examiner

SYSTEM FOR RECEIVING A CONTROL SIGNAL FROM A DEVICE FOR SELECTING ITS ASSOCIATED CLOCK SIGNAL FOR CONTROLLING THE TRANSFERRING OF INFORMATION VIA A BUFFER

Matter enclosed in heavy brackets [ ] appears in the original patent but forms no part of this reissue specification; matter printed in italics indicates the additions made by reissue.

This is a continuation of application Ser. No. 07/815,696, filed Dec. 30, 1991 now abandoned.

BACKGROUND OF THE INVENTION

1. Field of the Invention

This invention relates to computer circuitry and, more particularly, to methods and apparatus for increasing the speed with which information is transferred between a source of data and a destination which is to use that data.

2. History of the Prior Art

A computer is typically constructed of a number of components which cooperate with each other to manage information. For example, a typical computer includes a central processing unit which includes circuitry for controlling the manipulation of data, a main memory in which data and instructions are typically stored during the operation of a computer program, a frame buffer in which data is stored for display, various input/output devices, and an output monitor. It is typical of most computer operations that information is constantly being transferred from one of these components to another during the operation of the computer by means of a bus which joins all of the devices.

Often the various individual components used with a computer system operate independently in carrying out operations in order to speed the overall operation of the computer system. In order to accomplish this, the individual components often have their own clocking arrangements to precisely time their internal operations. Examples of such components are those which include their own internal processors such as floating point processors and graphics accelerators. When information is transferred from one such component to another in prior art systems, the information which is synchronized to the clock of the sending component must be synchronized to the clock of the receiving component so that it can be correctly interpreted and used by the second component. To accomplish this, data is typically stored in word length increments in some form of memory at the source component and transferred a word at a time at the clock rate of the source component. At the interface between the source and the destination components, each word of information is synchronized with the clock of the destination component by an operation that typically requires two clock cycles. Once the information has been synchronized to the clock of the destination component, it is available for use by the destination component. Synchronization must take place each time information is transferred from a component which operates on one clock to a component which operates on another. Consequently, where the information is transferred between asynchronous components by a bus which operates at a different clock frequency than either the source or the destination component, two individual synchronization operations must take place.

As computers have become more capable, it has become desirable to transfer more information faster between components of the system. Moreover, it is just as desirable that the individual components operate at their own optimum internal clock rates so that each may carry out its functions most rapidly. The synchronization of information to the clock of the destination component and the storage of the information during transfer between components consumes a substantial portion of the time required for the operation of a computer. It, therefore, becomes desirable to be able to provide some means for synchronizing the transfer of information between a large number of asynchronously operating components. The typical prior art computer has provided ad hoc synchronizing arrangements at each interface between two asynchronous devices. No simple arrangement for accomplishing synchronization between more than two components has yet been devised.

SUMMARY OF THE INVENTION

It is, therefore, an object of the present invention to accelerate the operation of computer systems.

It is another more specific object of the present invention to accelerate the transfer of information across computer interfaces.

It is yet another object of the present invention to accelerate the transfer of information across a computer interface by reducing the time required for the synchronization and storage of data.

It is still another object of the present invention to provide an arrangement for accelerating the transfer of information across a plurality of computer interfaces while reducing the time required for individual synchronization operations.

These and other objects of the present invention are realized in a computer system which comprises a first component having a first clock, means for storing information, means for transferring information from the first component to the means for storing information utilizing the clock of the first component, a second component having a second clock, and means for utilizing the clock of the second component to transfer information from the storage of the first component in a condition in which it is synchronized for use by the second component and may be immediately utilized by the second component without the need for storage by the second component.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
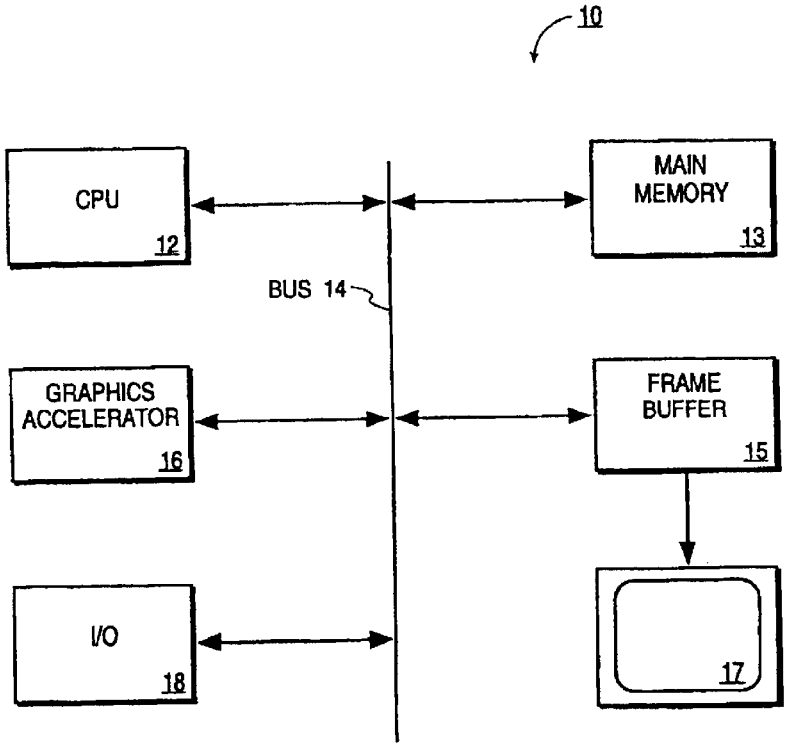
FIG. 1 (PRIOR ART)
FIG. 1 is a block diagram of a typical computer system constructed in accordance with the prior art.

Referring now to FIG. 1, there is shown a block diagram of a prior art computer system 10. The system 10 includes a central processing unit 12, main memory 13, a frame buffer 15, a graphics accelerator 16, an output display device 17, and input/output circuitry 18. The central processing unit 12, the main memory 13, the graphics accelerator 16, the input/output circuitry 18, and the frame buffer 15 are joined to one another by a system bus 14.

Quite often in the design of a computer system, certain of the components will for one reason or another operate at different clock rates and will have different internal clock generators for providing the clock pulses used within the components. Typically, for example, a central processing unit 12 and a graphics accelerator 16 using an internal processor will each have its own clock. It is always necessary when transferring signals across an interface between two system components which operate at different clock frequencies that the incoming signals which are synchronized to the clock of the source component be synchronized to the clock of the destination component so that the information may be properly interpreted by the destination component.

Figure 2:
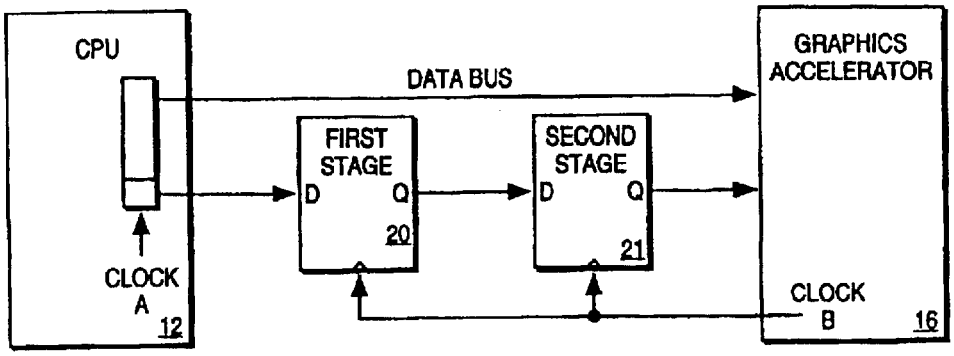
FIG. 2 (PRIOR ART)
FIG. 2 is a block diagram of circuitry for synchronizing signals in accordance with the prior art.

Typically each word of information which is transferred between components is synchronized as it is transferred. This is a time consuming operation. This is usually accomplished by placing the word to be transferred in a register and simultaneously synchronizing a single bit of the word through a handshake line. The single bit is transferred on the handshake line while the remaining bits of the word are transferred on the data bus. Each handshake line (see FIG. 2) includes two stages of D flip-flops, each stage receiving the data bit at its D terminal and being enabled by the clock of the component receiving the particular signal. Whereas in a synchronous system, the input data and the clock are properly timed, this is not necessarily true in an asynchronous system. In general, a sufficient incoming signal will cause the first stage flip-flop 20 to switch while an insufficient signal will have no effect. However, an incoming signal may cause the first stage flip-flop 20 to begin switching; and, because of the timing differential between the clock pulse of the destination component and the incoming signal, the first flip-flop 20 may assume a metastable condition, erratically switching between states until finally settling into either of the two possible states. If the incoming signal is of a sufficient amplitude that the first stage flip-flop 20 finally switches from this metastable condition, then the signal is transferred to the Q output terminal; and the incoming signals are synchronized with the clock of the destination component. If the input signal is insufficient and the first stage flip-flop 20 settles from the metastable condition into the wrong state, then the succeeding clock pulse will cause the first stage flip-flop 20 to transfer the signal; and the incoming signals and the clock of the destination component are synchronized. In either case, the final output of the first stage flip-flop 20 causes the second stage flip-flop 21 to take a state thereby isolating the dithering of the metastable state which may occur at the first stage flip-flop 20 from the destination circuitry. The state of the second stage flip-flop 21 is thus synchronized to the clock of the destination component. The remaining bits of the words carried on the data bus are clocked in as the second stage flip-flop is synchronized. This form or synchronization is commonly known as double rank synchronization.

It will be recognized that this form of synchronization is quite time consuming since it requires an average of two clock cycles and must by done for each word transferred between system components. However, this is the typical synchronization method used in prior art arrangements for accomplishing the transfer of data between asynchronous components.

It has now been found possible to eliminate a substantial amount of the time required to accomplish synchronization when transferring information between two asynchronous system components. The manner in which this is accomplished requires that information be transferred between system components in groups of words rather than as single words. In a preferred embodiment of the invention, information is transferred from the source component using the source clock and accumulated in a buffer holding up to sixty-four bytes of data before any information is transferred to the destination component. Other sizes of buffers would, of course, be possible. When a selected amount of information has accumulated and the transfer to the buffer is complete, a signal is sent to the destination component in synchronization with the clock of the source component. This signal is synchronized to the clock of the destination component in the typical fashion described above and requires the typical time to synchronize and transfer. However, the signal indicates to the destination component that the information has all been gathered in the buffer and that no operation is presently taking place with regard to that information. Since the receipt of the synchronization signal by the destination component indicates that the clock of the source component is not active with regard to the information in the buffer, it allows the clock of the destination component to be switched to the clock input terminals of the buffer which previously received the clock of the source component while storing the data.

The information is then transferred from the buffer of the source component for use by the destination component without any synchronization being necessary to the transfer. The information is simply clocked out by the clock of the destination component and is automatically synchronized to the destination component. Thus, the only synchronization necessary in the entire transfer is the synchronization of the signal which indicates to the destination component that the data is ready in the buffer for transmission. No word by word synchronization of any sort is required. This substantially reduces the time required to transfer data between two components running on different clocks.

Not only does the transfer of information in this manner substantially reduce the synchronization time required, it also reduces the amount of system hardware and the number of steps necessary to move information. More particularly, if the information is stored using the clock of the source system component but moved out of the buffer in response to the clock of the destination system component, the buffer may be treated as a buffer of the destination component when the information is moved out. Because of this, the destination component need not store the information in a second internal buffer before it can be used. The information is immediately usable and may be used as it is clocked out of the buffer by the destination component. This has the effect of making the buffer first a part of the source component and then a part of the destination component and reducing the buffering circuitry by half. Thus, in addition to the time saved by using batch synchronization rather than per word synchronization, the time that would have been necessary to place the information in a second buffer and read it out for use is also saved.

Moreover, while prior art systems have required that ad hoc synchronization be accomplished at each individual interface, the present arrangement is especially adapted to allow the synchronization of a large number of asynchronous components. By storing information to be transferred in packets at a buffer of a source component and broadcasting a signal that the information is ready on a broadcast bus to a plurality of destination components, any of those destination components may synchronize to the broadcast signal and accept the information. This transfer of information is made easy and very rapid because any destination component need only furnish its clock to the source buffer and the information in the packet is automatically synchronized to the clock of the accepting destination. Thus, a very simple system is able to synchronize a plurality of asynchronous components.

Figure 3:
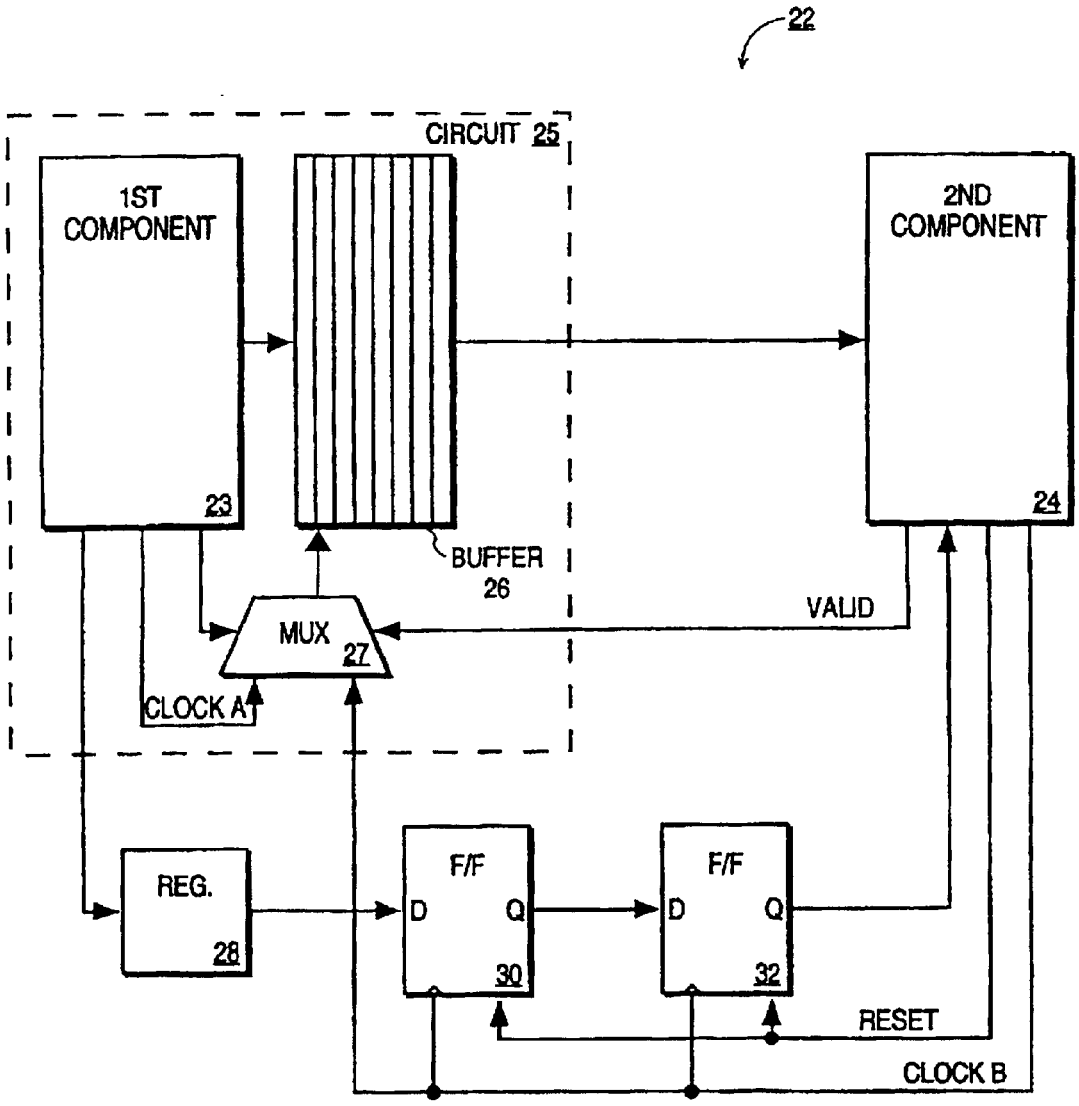
FIG. 3 is a block diagram of circuitry in accordance with the invention for transferring information from one component of a computer system to another.

FIG. 3 illustrates a basic circuit 22 for carrying out the invention of synchronizing the transfer of data between only two components. The circuit 22 includes a first component 23 and a second component 24. Each of the two system components operates in response to a different system clock. Consequently, data transferred between the two components 23 and 24 must be synchronized to the clock of the destination component 24 in order that the data be useful at the destination component.

In order to accomplish this result, a buffer 26 is provided. In FIG. 3, the buffer 26 is shown as a part of a circuit 25 (such as an integrated circuit) which includes the source component 23; the buffer 26 might also be positioned as a separate circuit component. The buffer 26 is arranged to receive information to be transferred from the component 23 to the component 24. The buffer 26 receives information transferred to it by the component 23 under control of the clock of the component 23. This clock is furnished to the buffer control circuitry by means of a multiplexor 27. In the preferred embodiment, such a buffer 26 is adapted to hold a maximum of sixty-four bytes of information.

When the buffer 26 has been filled with the information to be transferred, the component 23 generates a signal from a register 28 indicating that there is information ready to be transferred to the component 24. This signal is placed at the D input terminal of a first synchronizing flip-flop 30 which is clocked as described above by the clock of the destination component 24. The output of the D flip-flop 30 is transferred to a second D flip-flop 32 which is also clocked by the clock of the destination component 24. The output of the second D flip-flop 32 is synchronized to the clock of the component 24 and thus may be read by the destination component 24 as indicating that there is information in the buffer 26 waiting to be transferred to the component 24. The signal also indicates that no information is being clocked into the buffer 26 by the component 23 and that the synchronization circuitry is not in use.

This being the case, a valid signal is transferred from the component 24 to operate the multiplexor 27 so that the clock of the component 24 is transferred by the multiplexor 27 to clock the information stored in the buffer 26 to the component 24 for use. At the same time, the D flip-flops 30 and 32 are furnished a clearing signal at a reset terminal by the component 24 so that they may be utilized for the next synchronization required for the transfer of information.

It will be realized by those skilled in the art that the information furnished from the buffer 26 is automatically synchronized to the clock of the component 24 without the necessity of synchronizing any individual word of the information through two flip-flop stages, let alone all of the words gathered in the buffer 26. This saves a substantial amount of time in the transfer of information. Moreover, the information clocked out of the buffer 26 is ready for use immediately by the component 24. Consequently, the buffer 26 which was initially a logical part of the component 23 has become, in effect, a buffer of the component 24, furnishing information to the elements of the component 24. This both saves the necessity of storing the information somewhere in the component 24 before it can be used and saves the time for so storing the information and retrieving it.

To transfer information from the second component 24 to the first component 23 requires that similar circuitry be utilized to provide buffering for the second component 24, to signal that information is ready to be transferred, and to switch the clock of the first component 23 to drive the transfer of information from the buffer of the second component 24. This might utilize some or all of the same circuitry as did the transfer from the component 23.

Figure 4:
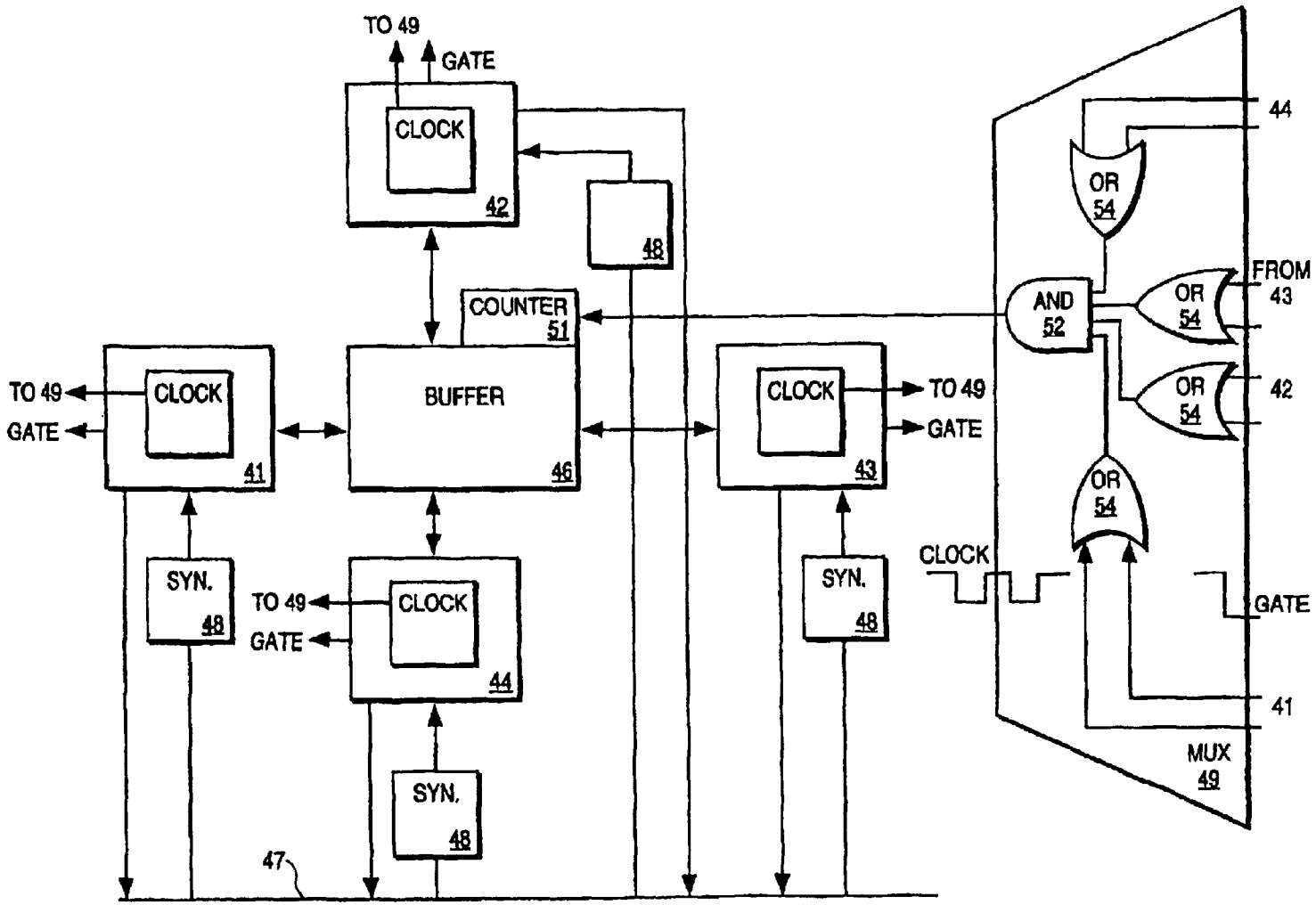
FIG. 4 is a block diagram of circuitry in accordance with the invention for transferring information from one component of a computer system to a plurality of other components.

FIG. 4 illustrates an arrangement is accordance with the invention by which a block of information may be clocked into a buffer from a source of information as described above and later clocked out by one of a plurality of destination components. The circuit 40 includes a number of components 41-44, any of which may theoretically serve as a source of information or as a destination for information. Each of the components 41-44 is connected by a data path to a buffer 46 which may store a selected amount of information, an amount such as sixty-four bytes. This information is clocked into the buffer 46 under control of the clock of the particular component 41-44 which is the source of the data. The means for providing the clock from the source component is described below.

Associated with the buffer 46 is a launch or broadcast bus 47. Each of the components 41-44 is connected to the launch bus so that when it has completed the transfer of information to storage in the buffer 46, it may place an address on the launch bus 47 indicating that the transfer to the buffer 46 is complete and giving the address of the destination device. Each of the components 41-44 using a circuit 48 synchronizes the signal (at least one bit of the signal) placed on the launch bus 47 with its clock (the clock of the addressed component). Each of the components 41-44 receives and decodes the address. When the addressed component is ready to receive the information, the addressed component returns a gate signal and its clock to a multiplexor 49 of the buffer 46. The multiplexor 49 transfers the clock from the addressed component to a counter 51 which controls the transfer of the information to the addressed component 41-44. In this manner, the information is written to the destination component under control of the destination clock and is immediately available for use by the destination component as in the arrangement shown in FIG. 3.

The multiplexor 49 illustrated in FIG. 4 is used in order to allow the clock of any one of the components to be used to clock the information into or out of the buffer 46. The multiplexor 49 includes an AND gate 52. The AND gate 52 receives input signals from all of the components 41-44. The input signals to the AND gate 52 are gated clock signals from each of the particular components. To accomplish this, an OR gate 54 is placed to receive the clock from the particular component 41-44 and a gate signal from that component. The gate signal indicates that the component is ready to send or receive information and is analogous to the valid signal sent from the source component in the circuit of FIG. 3. Normally when a component is not ready to transfer information, the gate signal is high. This high value is transferred by the OR gate 54 to the input of the AND gate 52. If none of the components are ready to send or receive information either because there is no information to send, none of the components are addressed, or the components are not ready if addressed, then a high value appears on each input to the AND gate 52. This high value is transferred to the counter. Consequently, no clock signal appearing at an OR gate 54 is transferred to the counter 51 to clock the information out of the buffer 46. On the other hand, when the gate signal at one of the OR gates 54 goes low, then the clock from the component 41-44 at the OR gate 54 is transferred to the AND gate 52. Since all of the other inputs to the AND gate 52 are high, the output of the AND gate 52 will reflect the high and low values of the clock from the selected destination component for transfer to the counter 51. In this manner, any of the components 41-44 may furnish its clock to the buffer 46 to clock information to the source component.

Thus, a plurality of asynchronous components may all be arranged with a simple and rapid synchronization system which allows any one of the components to receive the information from any other source component. The packetizing of information and the use of a broadcast bus to send signals from a source to which a plurality of destinations may synchronize, greatly enhances the speed of a computer system and makes possible the transfer of very large amounts of information.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising a first component operated in response to timing of a first clock, means for storing information, means for transferring information from the first component to the means for storing information always utilizing the first clock without synchronization to another clock, a second component operated in response to timing of a second clock, the timing of the first clock being independent of the timing of the second clock, means for utilizing the second clock to transfer information without synchronization with the first clock from the means for storing information without transferring other [data] *information* into said means for storing information whereby the information may be immediately utilized by the second component without need for storage by the second component, said means for utilizing the second clock to transfer information without synchronization with the first clock from said means for storing information comprising means for transferring the information in said means for storing information to the second component under control of the second clock, said means for transferring the information in said means for storing information to the second component under control of the second clock includes means for switching the second clock to the terminals used by the first clock, said means for switching the second clock to the terminals used by the first clock includes a multiplexor, said multiplexor coupled to said first component and said second component, said [multiplexor] *multiplexer* receiving a signal from the second component for furnishing a second clock signal from said second clock to said [buffer] *means for storing information* to transfer [data] *information* to said second component.

2. A computer system as claimed in claim 1 in which the means for utilizing the clock of the second component to transfer information from [the storage of the first component] *the means for storing information* in a condition in which it is synchronized for use by the second component comprises means for providing a signal to the second component to indicate that a prescribed amount of information has been stored in the [buffer] *means for storing information*.

3. A computer system as claimed in claim 1, in which the means for switching the second clock to the terminals used by the first clock includes means for signaling the [multiplexor] *multiplexer* that the second component is ready to accept the information in [the buffer] *the means for storing information*.

4. A computer *system* comprising a plurality of components operated in response to timing of different clocks, means for storing information, means for utilizing the clock of any one of the components to transfer information without synchronization of timing of different clocks between one of the components and the means for storing information, means for signaling any of the components that information stored in the means for storing is to be transferred to that one of the components as a destination component, means for utilizing the clock of the destination component to transfer information from the means for storing information without synchronization of timing of different clocks in a condition in which the information is synchronized for use by the destination component wherein the means for utilizing the clock of any one of the components always utilizes the clock of the component transferring information into said means for storing information, and wherein the timing of the clock of the component from which the information was transferred is independent of the timing of the clock of the destination component, said means for utilizing the clock of the destination component to transfer information from the means for storing information in a condition in which it is synchronized for use by the destination component includes a [multiplexor] *multiplexer* for transferring signals from [addressed components] *the*

*destination component* to [the means for storage] *the means for storing information*, said [multiplexor] *multiplexer* coupled to [a first component] *the component transferring information into the means for storing information* and [a second component] *the destination component*, said [multiplexor] *multiplexer* receiving a signal from said [second component] *the destination component* for furnishing a [second] clock signal from [said second clock] *the clock of the destination component* to [said buffer] *the means for storing information* to transfer [data] *information* to [said second component] *the destination component*.

5. A computer *system* as claimed in claim 4 in which the means for [signaling another of the components] *signaling a second destination component* that the information stored in the means for storing *information* is to be transferred to the [other of the components] *second destination component* comprises means for synchronizing a signal from the means for [signalling any one of the components] *signaling* with the clock of the *second* destination component.

6. A computer system as claimed in claim 4 in which the [multiplexor] *multiplexer* comprises an AND gate, and means for transferring gated clock signals from each of the components as inputs to the AND gate.

7. A computer *system* as claimed in claim 6 in which the means for transferring gated clock signals from each of the components as inputs to the AND gate comprises a plurality of OR gates, each such OR gate connected to receive a clock and a gating signal for transferring the clock from one of the components.

8. A computer system comprising:

a first component;

a first clock coupled to said first component, said first component operated in response to timing of said first clock;

a buffer coupled to said first component, said first component always using said first clock to transfer data from said first component to said buffer without synchronizing said transfer of said data to another clock;

a second component coupled to said buffer;

a second clock coupled to said second component, the timing of said first clock being independent of the timing of said second clock, said second component reading said data from said buffer using said second clock without synchronizing said reading to another clock and without transferring other data into said buffer;

a [multiplexor] *multiplexer* coupled to said first component and said second component, said [multiplexor] *multiplexer* receiving a signal from the second component for furnishing a second clock signal from said second clock to said buffer to transfer data to said second component.

9. A computer system as in claim 8 further comprising:

a third component;

a third clock coupled to said third component, said third component operated in response to timing of said third clock, the timing of said third clock being independent of the timing of said first clock, wherein said first component uses said first clock to transfer further data from said first component to said buffer without synchronizing said transfer of said further data to another clock, and wherein said third component transfers said further data from said buffer using said third clock without synchronizing said transfer of said further data to another clock.

10. A computer system as in claim 8 further comprising:

a third component;

a third clock coupled to said third component, said third component operated in response to timing of said third clock the timing of said third clock being independent of the timing of said second clock, wherein said second component uses said second clock to transfer further data from said second component to said buffer without synchronizing said transfer of said further data to another clock, and wherein said third component transfers said further data from said buffer using said third clock without synchronizing said transfer of said further data to another clock.

11. A computer system as in claim 8 wherein said data may be immediately utilized by said second component without storing said data in said second component.

12. A computer system as in claim 9 wherein said further data may be immediately utilized by said third component without storing said further data in said third component.

13. A computer system as in claim 8 wherein the transfer of said data into said buffer is controlled entirely by said first component and said first clock.

14. A method for transferring data between a plurality of components in a computer system including a first and a second component, said method comprising:

operating said first component using a first clock having a first timing;

operating said second components using a second clock having a second timing independent of said first timing;

transferring an entire packet of data having a plurality of words from said first component to a buffer always using said first clock without synchronizing any of said plurality of words to another clock;

once said entire packet of data is transferred from said first component to said buffer, signaling said second component that said entire packet of data is ready to be transferred to said second component;

transferring said entire packet of data to said second component using said second clock without transferring other data into said buffer;

furnishing a clock signal to said buffer from a [multiplexor] *multiplexer*, said [multiplexor] *multiplexer* coupled to said first component and said second component, said [multiplexor] *multiplexer* receiving a signal from the second component for furnishing a second clock signal from said second clock to said buffer to transfer data to said second component.

15. A method for transferring data as in claim 14, wherein said computer system comprises a third component and wherein said method further comprises:

operating said third component using a third clock having a third timing independent of said first clock;

transferring a further entire packet of data having a second plurality of words from said first component to said buffer using said first clock without synchronizing any of said second plurality of words to another clock;

once said further packet of data is transferred from said first component to said buffer, signaling said third component that said further entire packet of data is ready to be transferred to said third component;

transferring said further entire packet of data to said third component using said third clock without synchronizing any of said second plurality of words to another clock.

16. A method as in claim 14 wherein said second component uses said entire packet of data immediately without first storing said entire packet of data in said second component.

17. A method as in claim 15 wherein said third component uses said further entire packet of data immediately without first storing said further entire packet of data in said third component.

18. A method as in claim 15 wherein said step of signaling said second component occurs by broadcasting a first signal from said first component to said second and third components, said first signal being synchronized to said second clock, and wherein said step of signaling said third component occurs by broadcasting a second signal from said first component to said second and third components, said second signal being synchronized to said third clock.

19. A computer system as in claim 8 further comprising:

a bus for carrying a first signal, said bus being coupled to said first component and said second component, said first signal being provided by said first component and being synchronized to said second clock, said first signal being received by said second component and causing said second component to read said data from said buffer.

20. A computer system as in claim 9 further comprising:

a bus for carrying a first signal and a second signal, said bus being coupled to said first, second and third components, wherein said first signal is provided by said first component and is synchronized to said second clock, said first signal being received by said second component and said third component and causing said second component to read said data from said buffer, and wherein said second signal is provided by said first component and is synchronized to said third clock, said second signal being received by said third component and by said second component and causing said third component to read said further data from said buffer.

21. A computer system as in claim 19 wherein said data comprises a plurality of words having a selected number of words and wherein said plurality of words are transferred to said buffer without synchronizing any of said plurality of words to any clock except said first clock and wherein said first signal is received by said second component after all of said plurality of words are transferred to said buffer and wherein all of said plurality of words are transferred to said second component from said buffer after said second component receives said first signal.

22. A computer system as in claim 20 wherein said data comprises a plurality of words having a selected number of words, and wherein said plurality of words are transferred to said buffer without synchronizing any of said plurality of words to any clock except said first clock and wherein said first signal is received by said second component after all of said plurality of words are transferred to said buffer, and wherein all of said plurality of words are transferred to said second component from said buffer after said second component receives said first signal, and wherein said further data comprises a further plurality of words, and wherein said further plurality of words are transferred to said buffer without synchronizing any of said further plurality of words to any clock except said first clock and wherein said second signal is received by said third component after all of said further plurality of words are transferred to said buffer and wherein all of said further plurality of words are transferred to said third component from said buffer after said third component receives said second signal.

*23. An apparatus for use in a computer system for transferring data from a first component to a second component, the first component clocked by a first clock signal, and the second component clocked by a second clock signal, the apparatus comprising:*

*a buffer coupled to the first component and the second component via a data path, the first component always using the first clock signal to transfer data from the first component to the buffer without synchronizing the transfer of the data to another clock; and*

*a multiplexer having inputs coupled to the first clock signal and the second clock signal, and an output coupled to the buffer, the multiplexer supplying the first clock signal to the buffer to clock data from the first component to the buffer via the data path in the absence of a valid signal from the second component, and in response to the valid signal from the second component, supplying the second clock signal to the buffer to clock data from the buffer to the second component via the data path without transferring other data to the buffer;*

*wherein the timing of the first clock signal is independent of the timing of the second clock signal.*

*24. The apparatus of claim 23, wherein a ready signal from the first component is transmitted to the second component indicating that the transfer of data from the first component to the buffer is complete.*

*25. The apparatus of claim 23, wherein the buffer and multiplexer are part of an integrated circuit.*

*26. A method of transferring data between a first component and a second component in a computer system, the first component clocked by a first clock signal, and the second component clocked by a second clock signal, comprising:*

*clocking data from the first component to a buffer via a data path using the first clock signal in the absence of a valid signal from the* [first] *second component, the first component always using the first clock signal to transfer data from the first component to the buffer without synchronizing the transfer of the data to another clock;*

*clocking data from the buffer to the second component via the data path using the second clock signal in response to the valid signal from the second component without transferring other data to the buffer; and*

*supplying the first and second clock signals to the buffer via a multiplexer having a plurality of inputs and an output coupled to the buffer, the inputs for receiving the first and second clock signals and* [a] *the valid signal from the second component, the multiplexer supplying the second clock signal to the buffer in response to the valid signal; wherein the timing of the first clock signal is independent of the timing of the second clock signal.*

*27. The method of claim 26, further comprising transmitting a ready signal from the first component to the second component indicating that the transfer of data from the first component to the buffer is complete.*

*28. An apparatus for use in a computer system for transferring data between a plurality of components including at least one source component and at least one destination component, the source component clocked by a first clock signal, and the destination component clocked by a second clock signal, comprising:*

*a buffer coupled to the source component and the destination component via a data path, the source component always using the first clock signal to transfer data from the source component to the buffer without synchronizing the transfer of the data to another clock;*

*a multiplexer having inputs coupled to the first clock signal and the second clock signal, and an output*

*coupled to the buffer, the multiplexer supplying the first clock signal to the buffer to clock data from the source component to the buffer via the data path in the absence of a gate signal from the destination component, the multiplexer supplying the second clock signal to the buffer to clock data from the buffer to the destination component via the data path in response to the gate signal from the destination component without transferring other data to the buffer; and*

*a broadcast bus coupled to the source component, the destination component and the buffer, the broadcast bus for transferring a ready signal from the source component to the destination component indicating that the transfer of data from the* [first] *source component to the buffer is complete;*

*wherein the timing of the first clock signal is independent of the timing of the second clock signal.*

*29. The apparatus of claim 28, wherein the source component places the address of the destination component on the broadcast bus and the destination component* [supplying] *supplies the gate signal to the multiplexer in response to the address.*

*30. The apparatus of claim 28, wherein the buffer and the multiplexer are part of an integrated circuit.*

* * * * *

UNITED STATES PATENT AND TRADEMARK OFFICE

CERTIFICATE OF CORRECTION

PATENT NO. : RE 40,317 E
APPLICATION NO. : 09/815873
DATED : May 13, 2008
INVENTOR(S) : Steven G. Roskowski et al.

It is certified that error appears in the above-identified patent and that said Letters Patent is hereby corrected as shown below:

Column 12, line 34, delete "[first]".

Column 12, line 46, delete "[a]".

Column 14, line 1, delete "[first]".

Column 14, lines 7 and 8, delete "[supplying]".

Signed and Sealed this

Fifth Day of August, 2008

JON W. DUDAS
*Director of the United States Patent and Trademark Office*